US012066022B2

(12) United States Patent
Yonezawa et al.

(10) Patent No.: US 12,066,022 B2
(45) Date of Patent: Aug. 20, 2024

(54) MOTOR AND HYDRAULIC PUMP DEVICE INCLUDING THE MOTOR

(71) Applicant: KOSMEK LTD., Kobe (JP)

(72) Inventors: Keitaro Yonezawa, Kobe (JP); Yoshiki Okubo, Kobe (JP)

(73) Assignee: KOSMEK LTD., Kobe (JP)

( * ) Notice: Subject to any disclaimer, the term of this patent is extended or adjusted under 35 U.S.C. 154(b) by 422 days.

(21) Appl. No.: 17/633,724

(22) PCT Filed: Jul. 31, 2020

(86) PCT No.: PCT/JP2020/029512
§ 371 (c)(1),
(2) Date: Feb. 8, 2022

(87) PCT Pub. No.: WO2021/029236
PCT Pub. Date: Feb. 18, 2021

(65) Prior Publication Data
US 2022/0325705 A1 Oct. 13, 2022

(30) Foreign Application Priority Data
Aug. 9, 2019 (JP) ................................ 2019-148215

(51) Int. Cl.
*F04B 9/105* (2006.01)
*F04B 9/133* (2006.01)
*F15B 15/18* (2006.01)

(52) U.S. Cl.
CPC .............. *F04B 9/133* (2013.01); *F15B 15/18* (2013.01)

(58) Field of Classification Search
CPC ........ F04B 9/105; F04B 9/1056; F04B 9/125; F04B 9/1256; F04B 9/129; F01B 11/001; F01B 23/08; F15B 15/18
See application file for complete search history.

(56) References Cited

U.S. PATENT DOCUMENTS 4,325,285 A * 4/1982 Roser .................... F01B 11/001 91/466
4,870,890 A * 10/1989 Cowan .................... F01L 23/00 91/417 R (Continued)

FOREIGN PATENT DOCUMENTS

JP 60-208602 A 10/1985
JP 2-130401 U1 10/1990

OTHER PUBLICATIONS

Search Report dated Aug. 26, 2020, issued in corresponding International application No. PCT/JP2020/029512.

(Continued)

*Primary Examiner* — Thomas Fink
(74) *Attorney, Agent, or Firm* — BACON & THOMAS, PLLC

(57) ABSTRACT

A piston (8) is provided in a motor main body (4). A first motor chamber (9) is provided above the piston (8) and a second motor chamber (10) is provided below the piston (8). A pilot valve element (18) is provided so as to protrude from the piston (8). When a supply/discharge valve (13) is moved to its upper limit position or its lower limit position by the movement of the pilot valve element (18) in an up-down direction, a first valve member (25) of the supply/discharge valve (13) switches between supplying and discharging pressure fluid to and from the first motor chamber (9) and a second valve member (26) of the supply/discharge valve (13) switches between supplying and discharging pressure fluid to and from the second motor chamber (10).

8 Claims, 5 Drawing Sheets

(56) References Cited

U.S. PATENT DOCUMENTS 5,252,042 A * 10/1993 Yonezawa ............... F04B 49/16
92/85 B
5,493,945 A * 2/1996 Matsumura ............. F04B 9/107
91/309

OTHER PUBLICATIONS

Office Action dated Nov. 18, 2021, issued in corresponding Taiwan application No. 109126634.

* cited by examiner

MOTOR AND HYDRAULIC PUMP DEVICE INCLUDING THE MOTOR

TECHNICAL FIELD

The present invention relates to a motor configured to drive a piston using pressure fluid such as compressed air and to a hydraulic pump device including the motor.

BACKGROUND ART

Such a known hydraulic pump device is, for example, described in Patent Literature 1 (Japanese Laid-Open Utility Model Publication No. H2-130401). The known device is structured as follows.

In the known hydraulic pump device, a piston is inserted in a housing so as is to be movable in an up-down direction. A forward movement actuation chamber is provided above the piston, while a return movement actuation chamber is provided below the piston. A switching valve element is inserted in the housing so as to be movable in the up-down direction. The switching valve element is configured to switch between the state in which compressed air is supplied to the forward movement actuation chamber and the state in which compressed air is discharged from the chamber. A supply valve element is inserted in the housing, at a position other than that of the switching valve (a position above the switching valve element), so as to be movable in the up-down direction. The supply valve element is configured to switch between the state in which compressed air is supplied to the return movement actuation chamber and the state in which the supply of compressed air to the chamber is stopped. Furthermore, a relief valve element is inserted in the housing so as to be contactable with the supply valve element and so as to be movable in the up-down direction. The relief valve element is configured to switch between the state in which compressed air is discharged from the return movement actuation chamber and the state in which the discharge of compressed air from the chamber is stopped.

CITATION LIST

Patent Literature

Patent Literature 1: Japanese Laid-Open Utility Model Publication No. H2-130401

SUMMARY OF INVENTION

Technical Problem

In the known hydraulic pump device, the switching valve element w configured to switch between supplying and discharging compressed air to and from the forward movement actuation chamber and the supply valve element and the relief valve element, which are configured to switch between supplying and discharging compressed air to and from the return movement actuation chamber, are separately disposed in the housing at positions away from one is another in the up-down direction. Due to this, the hydraulic pump device is configured so that each of the switching valve element, the supply valve element and the relief valve element is driven separately from one another, depending on the degree of pressure in the forward movement actuation chamber or in the return movement actuation chamber, for example. The three valve elements are thus separately driven, and this makes the structure of the hydraulic pump device complicated. Furthermore, because the three valve elements are disposed at different positions, the hydraulic pump device has a large size in the up-down direction.

An object of the present invention is to provide: a compact motor having a mechanically simple structure; and a hydraulic pump device including the motor.

Solution to Problem

In order to achieve the above object, in an aspect of the present invention, a motor is structured as follows, as shown in FIG. 1 and FIG. 2, FIG. 3, and FIG. 4 and FIG. 5, for example.

A piston 8 is inserted in a cylinder hole 7 provided in a motor main body 4 so as to be movable in an axial direction of the cylinder hole 7. A first motor chamber 9 is provided on a first end side in the axial direction relative to the piston 8. A second motor chamber 10 is provided on a second end side in the axial direction relative to the piston 8. A supply/discharge valve 13 is configured to switch between a state in which pressure fluid is discharged from the second motor chamber 10 and is supplied to the first motor chamber 9 and a state in which pressure fluid is discharged from the first motor chamber 9 and is supplied to the second motor chamber 10. A pressure supply chamber 28 is provided on w the second end side in the axial direction relative to the supply/discharge valve 13, and pressure fluid supplied to the pressure supply chamber 28 pushes and moves the supply/discharge valve 13 to a first position on the first end side in the axial direction. A switching actuation chamber 36 is provided on the first end side in the axial direction relative to the supply/discharge valve 13, and pressure fluid is supplied to the switching actuation chamber 36 pushes and moves the supply/discharge valve 13 to a second position on the second end side in the axial direction. A pilot valve element 18 is provided so as to protrude from the piston 8. The pilot valve element 18 is configured to switch between supplying and discharging pressure fluid to and from the switching actuation chamber 36 through movement of the pilot valve element 18 in the axial direction. When the supply/discharge valve 13 is moved to the first position or to the second position, a first valve member 25 included in the supply/discharge valve 13 switches between supplying and discharging pressure fluid to and from the first motor chamber 9 and a second valve member 26 included in the supply/discharge valve 13 switches between supplying and discharging pressure fluid to and from the second motor chamber 10.

In the above aspect of the present invention, the following functions and effects are provided.

In the motor of the above aspect, the supply/discharge valve includes the first valve member and the second valve member, which are unitary with the supply/discharge valve or are components structuring the supply/discharge valve. Through the movement of the first valve member and the second valve member in the axial direction, the supply/discharge valve switches between supplying and discharging pressure fluid to and from the first motor chamber simultaneously with or not simultaneously but in synchronization with switching between supplying and discharging pressure fluid to and from the second motor chamber. This allows the motor of this aspect to have a compact size and a mechanically simple structure.

It is preferable to incorporate the following features (1) to (8) into the above aspect of the invention.

(1) The supply/discharge valve 13 includes: a supply/discharge valve body 24; the first valve member 25; and the second valve member 26. The first valve is member 25 of a tubular shape is fitted over an outer peripheral wall of the supply/discharge valve body 24 so as to be movable in the axial direction. The first valve member 25 is configured to be biased by a first spring 39 toward the first end side in the axial direction and is received from the first end side in the axial direction by a protrusion 27 protruding from the outer peripheral wall of the supply/discharge valve body 24 outward in a radial direction of the supply/discharge valve body 24. Furthermore, the second valve member 26 of a tubular shape is fitted over the outer peripheral wall of the supply/discharge valve body 24 so as to be movable in the axial direction. The second valve member 26 is configured to be biased by a second spring 40 toward the second end side in the axial direction and is received by the protrusion 27 from the second end side in the axial direction.

In this arrangement, the first valve member is biased by the first spring toward the first end side when the supply/discharge valve has been moved to the first position. Due to this, a passage through which pressure fluid is discharged from the first motor chamber is closed by the first valve member and a passage through which pressure fluid is supplied to the first motor chamber is opened. At this time, the supply/discharge valve body moves the second valve member toward the first end side via the protrusion. Due to this, a passage through which pressure fluid is supplied to the second motor chamber is dosed by the second valve member and a passage through which pressure fluid is discharged from the second motor chamber is opened. Thus, the supply/discharge valve is configured to reliably dose both the passage through which pressure fluid is discharged from the first motor chamber and the passage through which pressure fluid is supplied to the second motor chamber.

Meanwhile, when the supply/discharge valve has been moved to the second position, the supply/discharge valve body moves the first valve member toward the second end side via the protrusion. Due to this, the passage through which pressure fluid is supplied to the first motor chamber is closed by the first valve member and the passage through which pressure fluid is discharged from is the first motor chamber is opened. At this time, the second valve member is biased by the second spring toward the second end side. Due to this, the passage through which pressure fluid is discharged from the second motor chamber is closed by the second valve member and the passage through which pressure fluid is supplied to the second motor chamber is opened. Thus, the supply/discharge valve is configured to reliably close both the passage through which pressure fluid is supplied to the first motor chamber and the passage through which pressure fluid is discharged from the second motor chamber.

(2) The supply/discharge valve 13 is structured by a supply/discharge valve body 24, the first valve member 25, and the second valve member 26, which are unitary with one another.

In this arrangement, when the supply/discharge valve has been moved to the first position, the passage through which pressure fluid is discharged from the first motor chamber is closed by the first valve member, and the passage through which pressure fluid is supplied to the first motor chamber is opened. At this time, the passage through which pressure fluid is supplied to the second motor chamber is dosed by the second valve member, and the passage through which pressure fluid is discharged from the second motor chamber is opened. Thus, the supply/discharge valve is configured to reliably and substantially simultaneously dose both the passage through which pressure fluid is discharged from the first motor chamber and the passage through which pressure fluid is supplied to the second motor chamber.

Meanwhile, when the supply/discharge valve has been moved to the second position, the passage through which pressure fluid is supplied to the first w motor chamber is closed by the first valve member, and the passage through which pressure fluid is discharged from the first motor chamber is opened. At this time, the passage through which pressure fluid is discharged from the second motor chamber is closed by the second valve member, and the passage through which pressure fluid is supplied to the second motor chamber is opened. Thus, is the supply/discharge valve is configured to reliably and substantially simultaneously close both the passage through which pressure fluid is supplied to the first motor chamber and the passage through which pressure fluid is discharged from the second motor chamber.

(3) The supply/discharge valve 13 includes: a supply/discharge valve body 24; the first valve member 25; the second valve member 26; and a transmission member 87. The first valve member 25 of a tubular shape is fitted over an outer peripheral wall of the supply/discharge valve body 24 so as to be movable in the axial direction. The first valve member 25 is configured to be biased by a first spring 39 toward the first end side in the axial direction and received from the first end side in the axial direction by a step portion 85 provided to the supply/discharge valve body 24. The second valve member 26 of a tubular shape is fitted over the outer peripheral wall of the supply/discharge valve body 24 so as to be movable in the axial direction. The second valve member 26 is configured to be biased by a second spring 40 toward the second end side in the axial direction. The tubular transmission member 87 is inserted between the first valve member 25 and the second valve member 26. The transmission member 87 is configured to receive the second valve member 26 from the second end side in the axial direction against a biasing force of the second spring 40.

In this arrangement, the first valve member is biased by the first spring toward the first end side when the supply/discharge valve has been moved to the first position. Due to this, the passage through which pressure fluid is discharged from the first motor chamber is closed by the first valve member and the passage through which pressure fluid is supplied to the first motor chamber is opened. At this time, the transmission member moves the second valve w member toward the first end side. Due to this, the passage through which pressure fluid is supplied to the second motor chamber is closed by the second valve member and the passage through which pressure fluid is discharged from the second motor chamber is opened. Thus, the supply/discharge valve is configured to reliably close both the passage through which pressure fluid is is discharged from the first motor chamber and the passage through which pressure fluid is supplied to the second motor chamber.

Meanwhile, when the supply/discharge valve has been moved to the second position, the step portion of the supply/discharge valve body moves the first valve member toward the second end side. Due to this, the passage through which pressure fluid is supplied to the first motor chamber is closed by the first valve member and the passage through which pressure fluid is discharged from the first motor chamber is opened. At this time, the second valve member is biased by the second spring toward the second end side. Due to this, the passage through which pressure fluid is discharged from the second motor chamber is closed by the second valve member and the passage through which pressure fluid is supplied to the second motor chamber is opened. Thus, the supply/discharge valve is configured to reliably close both the passage through which pressure fluid is supplied to the first motor chamber and the passage through which pressure fluid is discharged from the second motor chamber.

(4) An auxiliary spring 38, 81 is attached on the first or second end side in the axial direction relative to the supply/discharge valve 13. The auxiliary spring 38, 81 biases the supply/discharge valve 13 toward the second or first end side in the axial direction.

In this arrangement, the auxiliary spring biases and reliably moves the supply/discharge valve to the first or second position before the pressure of pressure fluid is supplied to the pressure supply chamber, with a biasing force exceeding a resistance force due to friction such as a resistance of packing in w the supply/discharge valve or due to the self-weight of the supply/discharge valve. This prevents the supply/discharge valve from being moved to an intermediate position between the first and second positions, at which pressure fluid is supplied to and discharged from the first and second motor chambers, which renders the motor inoperable.

(5) The second motor chamber 10 is communicatively connected to the switching actuation chamber 36 by a passage 78. A throttle passage 79 is provided at a part of or all over the passage 78.

In the motor of the above aspect, pressure fluid in the switching actuation chamber may accidentally leak little by little for some reason while the pressure fluid supplied to the switching actuation chamber pushes and moves the supply/discharge valve toward the second position. In this case, the supply/discharge valve comes close to move to an intermediate position between the first and second positions, however, pressure fluid in the second motor chamber gently flows to the switching actuation chamber through the passage (throttle passage), and therefore the supply/discharge valve is held at the second position. Consequently, it is possible to prevent the motor from becoming inoperable.

(6) A first working chamber 29 is communicatively connected to the pressure supply chamber 28. The first valve member 25 is disposed in the first working chamber 29. A second working chamber 31 is communicatively connected to the pressure supply chamber 28. The second valve member 26 is disposed in the second working chamber 31. A pressure discharge chamber 34 is communicatively connected to the first working chamber 29 to the second working chamber 31. The pressure discharge chamber 34 is provided between the first working chamber 29 and the second working chamber 31. The first working chamber 29, the pressure discharge chamber 34, and the second working chamber 31 are arranged in the axial direction.

This arrangement allows the motor of this aspect to have a compact size and a mechanically simple structure.

(7) A hydraulic pump device of an aspect of the present invention includes: the motor; and a pump 3 configured to be driven by the motor. The pump 3 is includes: a plunger 22; a first pump chamber 61; a second pump chamber 62; a first inlet valve 65; a second inlet valve 66; a first outlet valve 67; and a second outlet valve 68. The plunger 22 is connected to the piston 8 and inserted in the pump 3 so as to be movable in the axial direction. A large-diameter portion 60 is provided at an intermediate portion of the plunger 22. A first pump chamber 61 is provided on the first end side in the axial direction relative to the large-diameter portion 60. A second pump chamber 62 is provided on the second end side in the axial direction relative to the large-diameter portion 60. A first inlet valve 65 is provided to a first inlet passage **63*a* which communicatively connects an inlet port 63 of hydraulic oil to the first pump chamber 61, and the first inlet valve 65 is configured to allow a flow of hydraulic oil from the inlet port 63 to the first pump chamber 61 and to block the reverse flow. A second inlet valve 66 is provided to a second inlet passage 63*b* which communicatively connects the inlet port 63 to the second pump chamber 62, and the second inlet valve 66 is configured to allow a flow of hydraulic oil from the inlet port 63 to the second pump chamber 62 and to block the reverse flow. A first outlet valve 67 is provided to a first outlet passage 64*a* which communicatively connects the first pump chamber 61 to an outlet port 64 of hydraulic oil, and the first outlet valve 67 is configured to allow a flow of hydraulic oil from the first pump chamber 61 to the outlet port 64 and to block the reverse flow. A second outlet valve 68 is provided to a second outlet passage 64*b* which communicatively connects the second pump chamber 62 to the outlet port 64 of hydraulic oil, and the second outlet valve 68 is configured to allow a flow of hydraulic oil from the second pump chamber 62 to the outlet port 64** and to block the reverse flow.

In this arrangement, the plunger is moved by the motor with the substantially same driving force in forward and return strokes, and this allows the w device to discharge hydraulic oil continuously in both of the forward and return strokes.

(8) The plunger 22 includes a first small-diameter portion **22*a*, the large-diameter portion 60, and a second small-diameter portion 22*b*. The first is small-diameter portion 22*a* is connected to the piston 8. The large-diameter portion 60 having a diameter larger than the diameter of the first small-diameter portion 22*a* is connected to the first small-diameter portion 22*a*. The second small-diameter portion 22*b* having a diameter substantially equal to the diameter of the first small-diameter portion 22*a* is connected to the large-diameter portion 60**.

This arrangement allows the hydraulic pump device of this aspect to continuously discharge a substantially same amount of hydraulic oil in the forward and return strokes.

Advantageous Effects of Invention

According to embodiments of the present invention, it is possible to provide a compact motor having a mechanically simple structure and a hydraulic pump device including the motor.

DESCRIPTION OF EMBODIMENTS

Figure 1:
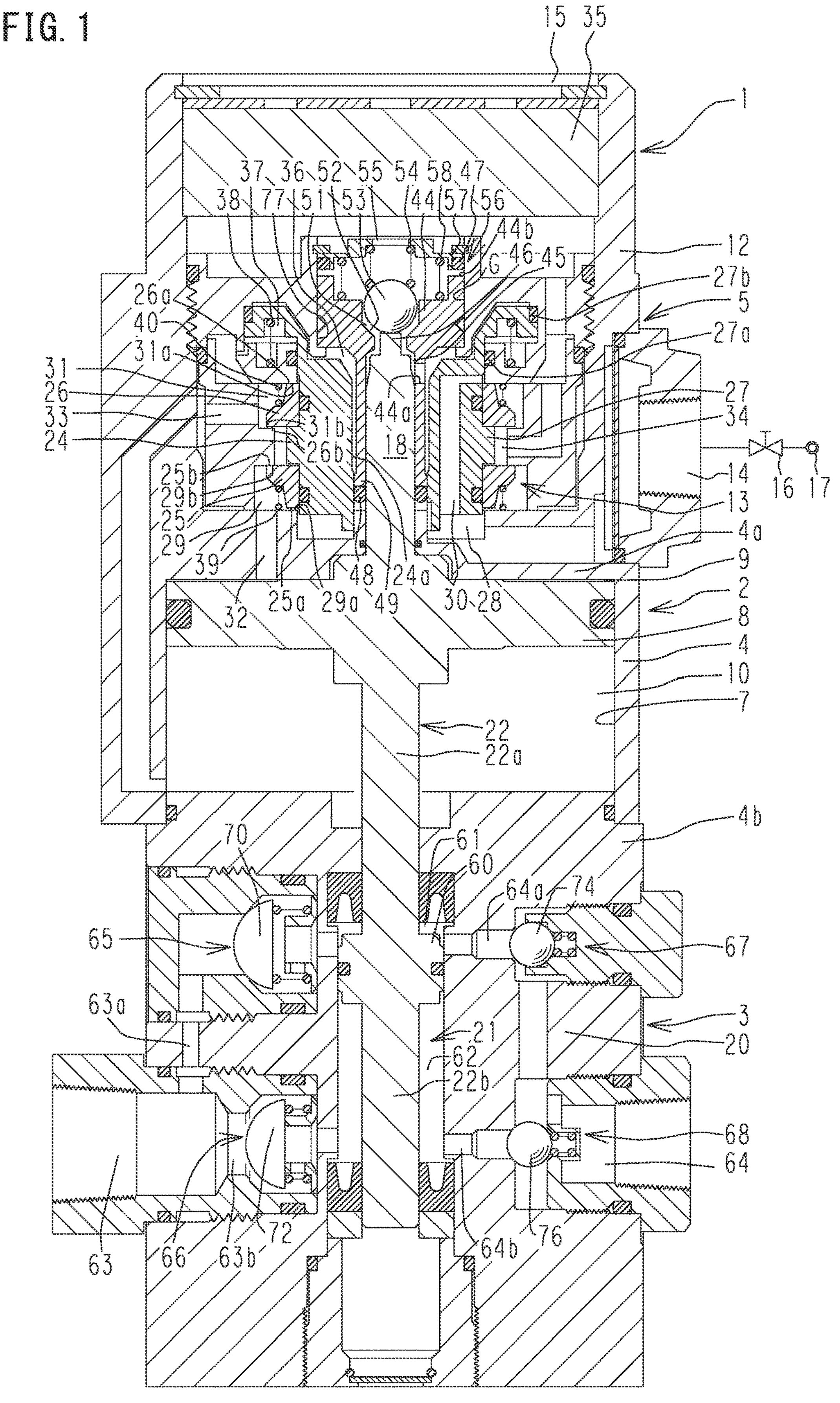
FIG. 1 shows a first embodiment of the present invention, and is a schematic cross-sectional view of a hydraulic pump device.
Figure 2:
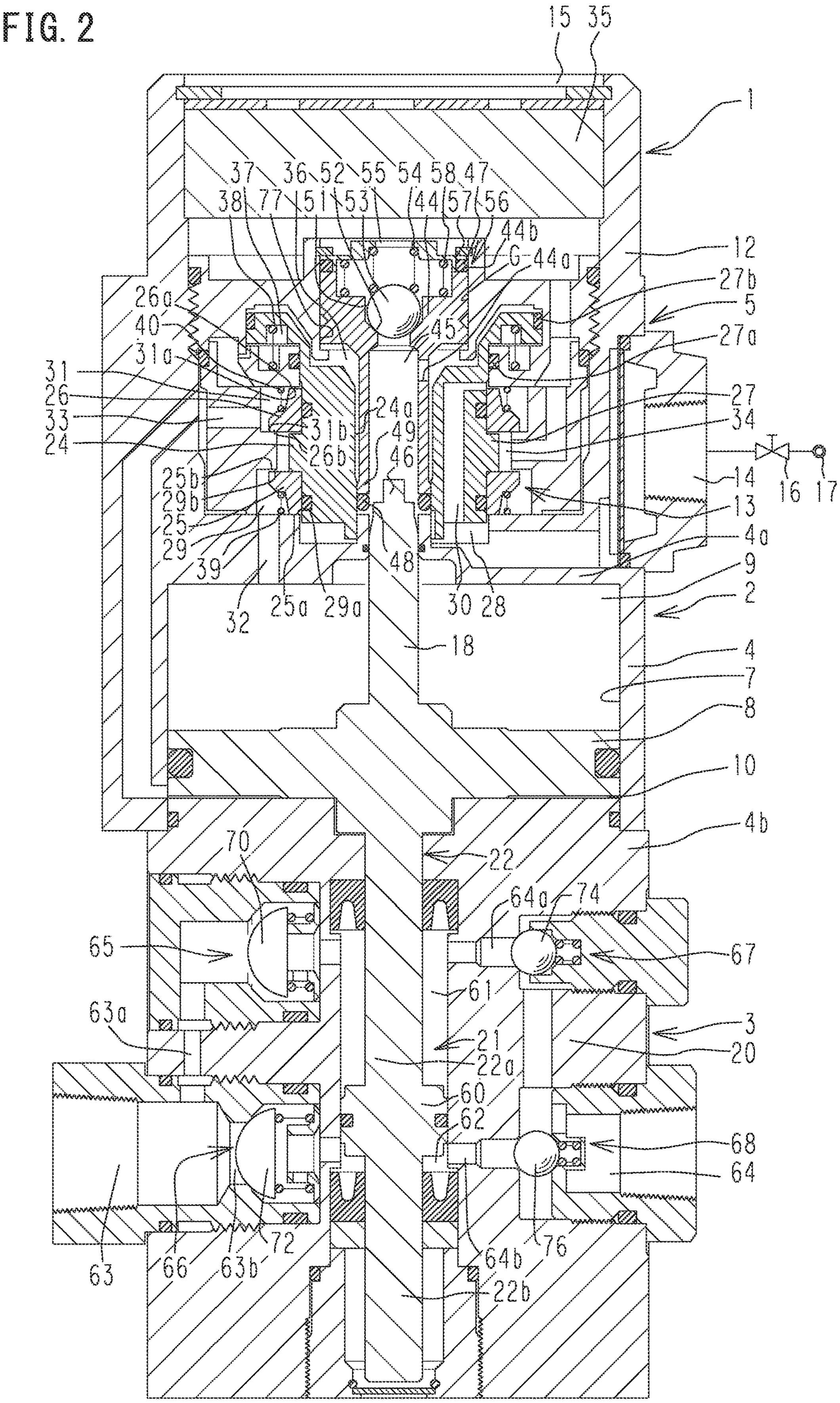
FIG. 2 is a diagram illustrating operation of the hydraulic pump device and similar to FIG. 1.

The following describes a first embodiment of the present invention with reference to FIG. 1 and FIG. 2.

A hydraulic pump device 1 shown in FIG. 1 includes: a pneumatic piston motor 2, hereinafter simply referred to as a motor 2, configured to linearly reciprocate with the use of compressed air functioning as pressure fluid; and a plunger hydraulic pump 3, hereinafter simply referred to as a pump 3, configured to be driven by the motor 2 to discharge high-pressure oil. The motor 2 includes: a motor main body 4 configured to transform pressure energy of compressed air to power; and a compressed air supply/discharge mechanism 5, hereinafter simply referred to as a supply/discharge mechanism 5, configured to supply and discharge compressed air to and from the motor main body 4. The motor 2 and the supply/discharge mechanism 5 are fixed to the pump 3.

In the motor main body 4, a cylinder hole 7 is bored in an up-down direction (axial direction). A driving piston 8 is hermetically inserted in the cylinder hole 7 so as to be movable in the up-down direction, which is the axial direction of the cylinder hole 7 and is hereinafter simply referred to as the axial direction. A first motor chamber 9 is provided between an upper wall 4*a* of the motor main body 4 and the piston 8, that is, above the piston 8 (on a first end side in the axial direction relative to the piston 8). Meanwhile, a second motor chamber 10 is provided between a lower wall 4*b* of the motor main body 4 and the piston 8, that is, below the piston 8 (on a second end side in the axial direction relative to the piston 8). The piston 8 is moved to its lower limit position when compressed air is discharged from the second motor chamber 10 and is supplied to the first motor chamber 9. The piston 8 is moved to its upper limit position when compressed air is discharged from the first motor chamber 9 and is supplied to the second motor chamber 10.

The supply/discharge mechanism 5 is provided in a valve case 12 provided above the motor main body 4, and has a supply/discharge valve 13. The supply/discharge valve 13 is capable of switching each of the first motor chamber 9 and the second motor chamber 10 to a pressure supply port 14 or to a pressure discharge port 15. The pressure supply port 14 is connected to a is compressed air source 17 via a supply valve 16, while the pressure discharge port 15 is communicatively connected to an outside (outside of the valve case 12). The supply/discharge valve 13 is configured to be switchable between an upper limit position shown in FIG. 1 and a lower limit position shown in FIG. 2, pushed by a pilot valve element 18 protruding upward from the piston 8.

The pump 3 has a plunger 22 protruding downward from the piston 8. The plunger 22 is hermetically inserted in a pump chamber 21 so as to be movable in the up-down direction (the axial direction). The pump chamber 21 is provided in the pump 3 so as to extend in the up-down direction. The movement of the plunger 22 in the up-down direction sends hydraulic oil out of the pump chamber 21 through an outlet port 64.

Now, the structure of the supply/discharge mechanism 5 is described with reference to FIG. 1 and FIG. 2.

The supply/discharge valve 13 having a tubular shape is inserted in the valve case 12 so as to be movable in the up-down direction (in the axial direction). The supply/discharge valve 13 includes: a tubular supply/discharge valve body 24; a tubular first valve member 25 hermetically fitted over an outer peripheral wall of a lower portion of the supply/discharge valve body 24 so as to be movable in the up-down direction (in the axial direction); and a tubular second valve member 26 hermetically fitted over an outer peripheral wall of an upper portion of the supply/discharge valve body 24 so as to be movable in the up-down direction (in the axial direction). The first valve member 25 has a small-diameter portion and a large-diameter portion, which are arranged in this order from its lower side (from the second end side in the axial direction). The w second valve member 26 has a large-diameter portion and a small-diameter portion, which are arranged in this order from its lower side (from the second end side in the axial direction). A protrusion 27 is provided on the outer peripheral wall of the supply/discharge valve body 24 in its circumferential direction so as to protrude outward in the radial direction of the supply/discharge valve body 24. The protrusion 27 receives the first valve member 25 from above (from the first end side in the axial direction). The protrusion 27 receives the second valve member 26 from below (from the second end side in the axial direction). That is, the supply/discharge valve 13 is a single assembly made by combining the supply/discharge valve body 24 with the first valve member 25 and the second valve member 26. The motor of this embodiment is thus configured so that, when the whole assembly is moved to its upper limit position or lower limit position, the supply/discharge valve 13 switches between supplying and discharging compressed air to and from the first motor chamber 9 simultaneously with or not simultaneously but in synchronization with switching between supplying and discharging compressed air to and from the second motor chamber 10. The motor of this embodiment has therefore a mechanically simple structure as compared to the above-described known device. Although in the above embodiment the protrusion 27 is unitary with the supply/discharge valve body 24, the supply/discharge valve body with the protrusion may be structured by a combination of two or more components, such as the supply/discharge valve body 24 and one or more protruding members functioning as the protrusion 27. For example, the following structure is possible: an accommodation groove is provided on the outer peripheral wall of the supply/discharge valve body 24 in its circumferential direction; two or more protruding members made by dividing a ring-like member into halves are attached in the accommodation groove; and outer peripheral walls of the protruding members are fixed with a retaining ring. Alternatively, the protrusion 27 may be structured by one or more pin members pressed into or screwed into hole(s) provided in the outer peripheral wall of the supply/discharge valve body 24.

In the valve case 12, a pressure supply chamber 28 is provided below the supply/discharge valve body 24 (on the second end side in the axial direction relative to the supply/discharge valve body 24). The pressure supply chamber 28 is communicatively connected to the compressed air source 17 via the pressure supply port 14 provided to the valve case 12. The pressure supply is chamber 28 is communicatively connected to a first working chamber 29, provided on an outer peripheral side of a lower portion of the supply/discharge valve 13, and is communicatively connected to a second working chamber 31, provided on an outer peripheral side of an upper portion of the supply/discharge valve 13, through a communication passage 30 provided in the supply/discharge valve body 24 in the up-down direction (the axial direction). The first working chamber 29 is communicatively connected to the first motor chamber 9 via a first supply/discharge hole 32 provided to the valve case 12. The second working chamber 31 is communicatively connected to the second motor chamber 10 via a second supply/discharge hole 33 provided to the valve case 12. The first valve member 25 is disposed in the first working chamber 29, and the second valve member 26 is disposed in the second working chamber 31.

A pressure discharge chamber 34 is provided on an outer peripheral side of the protrusion 27 of the supply/discharge valve 13 and between the first working chamber 29 and the second working chamber 31. The pressure discharge chamber 34 is communicatively connected to the first working chamber 29 and to the second working chamber 31, and is also connected via a muffler 35 to the pressure discharge port 15 provided to an upper portion of the valve case 12. The first working chamber 29, the pressure discharge chamber 34, and the second working chamber 31 are thus arranged in the up-down direction and are disposed together in one place, on the outer peripheral side of the supply/discharge valve 13. Due to this, the motor 2 of this embodiment has a mechanically simple structure as compared to those like the known device, for example, in which valves and working chambers are disposed at different positions away from each other. Furthermore, the above arrangement makes it possible to downsize the motor of this embodiment with respect to the up-down direction.

A switching actuation chamber 36 is provided on an opposite side (on an upper side) of the supply/discharge valve 13 from the pressure supply chamber 28. To be more specific, the switching actuation chamber 36 is provided inside a is tubular hole 24*a* of the supply/discharge valve body 24 and above an upper end portion of the supply/discharge valve body 24.

The upper end portion of the supply/discharge valve body 24 is designed so that its diameter is larger than the diameter of a lower half portion of the supply/discharge valve body 24. Furthermore, the pressure receiving area of the upper end portion is designed to be larger than the pressure receiving area of the lower half portion. Due to this, as described below, when the pilot valve element 18 is moved to its lower limit position to cause the pressure supply chamber 28 to be communicatively connected to the switching actuation chamber 36 via a pilot valve chamber 45 and the like, an upward pressure force of the compressed air in the pressure supply chamber 28 is exerted on the pressure receiving area of the lower half portion of the supply/discharge valve body 24 and a pressure force of the compressed air in the switching actuation chamber 36 is exerted on the pressure receiving area of the upper end portion of the supply/discharge valve body 24. The force of the difference, which is obtained by subtracting the upward pushing force of the pressure of the compressed air in the pressure supply chamber 28 acting on the pressure receiving area of the lower half portion from the downward pushing force of the pressure of the compressed air in the switching actuation chamber 36 acting on the pressure receiving area of the upper end portion, is exerted onto the supply/discharge valve body 24 downward. Here, the pressure receiving area of the lower half portion is the area of the cross-section of the lower half portion that is outward of a sealing member 48 in the radial direction of the cylinder hole and is inward of a sealing member 27*a* in said radial direction, that is, the area of the cross-section of the lower half portion, to which the pressure of the compressed air in the pressure supply chamber is applied. Meanwhile, the pressure receiving area of the upper end portion is the area of the cross-section of the lower half portion that is outward of the sealing member 48 in said radial direction and is inward of a sealing member 27*b* in said radial direction, that is, the area of the cross-section of the lower half portion, to which the pressure of the compressed air in the switching actuation chamber 36 is applied.

A spring chamber 37 is provided below the upper end portion. The spring chamber 37 is communicatively connected to the pressure discharge port 15 through a ventilation hole. An auxiliary spring 38 is attached in the spring chamber 37. The auxiliary spring 38 biases the supply/discharge valve body 24 upward (toward the first end side in the axial direction) relative to the valve case 12. Due to this, before the pressure of compressed air supplied to the pressure supply port 14 is applied to the supply/discharge valve 13, the auxiliary spring 38 reliably biases the supply/discharge valve 13 upward, and therefore the supply/discharge valve 13 has been pushed and moved to its upper limit position (to a first position on the first end side in the axial direction). If the supply/discharge valve 13 moves to an intermediate position between the upper limit position and the lower limit position (between the first position and a second position on the second end side in the axial direction), each of the first and second motor chambers 9 and 10 may be communicatively connected to both of the pressure supply port 14 and the pressure discharge port 15, which renders the hydraulic pump device inoperable. Such a situation can be prevented by the above arrangement. Here, the spring constant of the auxiliary spring 38 is designed so that the biasing force of the auxiliary spring 38 exceeds at least resistance forces due to the friction between the supply/discharge valve 13 and an accommodation hole of the supply/discharge valve 13 (resistance of packing) and/or due to the self-weight of the supply/discharge valve 13.

A first spring 39 is attached in the first working chamber 29, between a bottom surface of the first working chamber 29 and an under surface of the large-diameter portion of the first valve member 25. The first spring 39 biases the first valve member 25 upward relative to the valve case 12 Furthermore, a w second spring 40 is attached in the second working chamber 31, between a ceiling surface of the second working chamber 31 and a top surface of the large-diameter portion of the second valve member 26. The second spring 40 biases the second valve member 26 downward relative to the valve case 12.

A first pressure-supply-side valve seat 29*a* is provided on the bottom surface of the first working chamber 29. A first pressure-supply-side valve surface 25*a* configured to be contactable with the first pressure-supply-side valve seat 29*a* is provided on an under surface of the first valve member 25. Meanwhile, a first pressure-discharge-side valve seat 29*b* is provided on a ceiling surface of the first working chamber 29. A first pressure-discharge-side valve surface 25*b* configured to be contactable with the first pressure-discharge-side valve seat 29*b* is provided on a top surface of the first valve member 25.

A second pressure-supply-side valve seat 31*a* is provided on the ceiling surface of the second working chamber 31. A second pressure-supply-side valve surface 26*a* configured to be contactable with the second pressure-supply-side valve seat 31*a* is provided on a top surface of the second valve member 26. Meanwhile, a second pressure-discharge-side valve seat 31*b* is provided on a bottom surface of the second working chamber 31. A second pressure-discharge-side valve surface 26*b* configured to be contactable with the second pressure-discharge-side valve seat 31*b* is provided on an under surface of the second valve member 26.

The pilot valve element 18 is provided so as to protrude upward from the piston 8. The movement of the pilot valve element 18 in the up-down direction accompanying the piston 8 switches between an open state in which communication between the pressure supply chamber 28 and the switching actuation chamber 36 is allowed by the supply/discharge valve 13 and a closed state in which the communication is not allowed. Thus, the supply/discharge valve 13 is switched between its upper limit position and its lower limit position. The pilot valve element 18 will be described with reference to FIG. 1 and FIG. 2.

A small-diameter lower half portion of a tubular sleeve 44 is inserted in the tubular hole 24*a* of the supply/discharge valve body 24 so as to be movable in is the up-down direction. The pilot valve chamber 45 is provided in a tubular hole of the sleeve 44. The pilot valve element 18 is inserted in the pilot valve chamber 45 so as to be movable in the up-down direction (the axial direction).

A gap is created between an inner peripheral surface of the tubular hole 24*a* of the supply/discharge valve body 24 and an outer peripheral surface of the sleeve 44. The annular sealing member 48 is hermetically inserted in a space between an outer peripheral surface of the pilot valve element 18 and the inner peripheral surface of the tubular hole 24*a*. The upward movement of the annular sealing member 48 is restricted by a receiver 49 provided at a lower end portion of the sleeve 44.

A pressure releasing valve seat 52 is provided on an inner peripheral wall of the tubular hole of the sleeve 44. A pressure releasing valve element 53 (pressure releasing ball) is biased downward by a valve-closing spring 54 toward the valve seat 52. The pressure releasing valve element 53 is configured to be contactable with a pressure releasing operating rod 46 (hereinafter simply referred to as an operating rod 46), which is provided as a portion of the pilot valve element 18 at a leading end portion thereof. A pressure releasing port 55 provided at an upper portion of the valve case 12 is communicatively connected to the outside of the valve case 12 (to the outside) through the pressure discharge port 15.

The sleeve 44 has a large-diameter portion provided at its upper portion. A throttle passage G is provided between an outer peripheral wall of the large-diameter portion and an accommodation hole 77 of the valve case 12. An opening/closing means 56 configured to open/close the throttle passage G is w provided between an upper end portion of the sleeve 44 and an upper end wall 57 provided at the upper portion of the valve case 12. The opening/closing means 56 includes: an annular sealing member 47 attached in an annular groove provided on the upper end wall 57; and an annular engagement surface 44*b* provided on an upper end surface of the sleeve 44. The engagement is surface 44*b* of the sleeve 44 is opposed to the sealing member 47 with a space between them, so as to be contactable with each other. When the sleeve 44 is raised to bring the engagement surface 44*b* into contact with the sealing member 47, the throttle passage G is closed. When the engagement surface 44*b* is separated from the sealing member 47, the throttle passage G is opened. That is, when the pressure in the switching actuation chamber 36 is below a set pressure, the sleeve 44 is moved downward by the biasing force of a compression spring 58 attached between the upper end wall 57 and the sleeve 44, so that the throttle passage G is opened (the opening/closing means 56 is at an open position). Meanwhile, when the pressure in the switching actuation chamber 36 exceeds the set pressure, the sleeve 44 is moved to its upper end position by the compressed air in the switching actuation chamber 36, so that the throttle passage G is closed (the opening/closing means 56 is at a closed position).

The pilot valve element 18 (operating rod 46) and the opening/closing means 56 operate as follows.

When the pilot valve element 18 is switched (lowered) from its upper limit position shown in FIG. 1 to its lower limit position shown in FIG. 2 along with the descent of the piston 8, the pressure releasing valve element 53 is at first seated on the pressure releasing valve seat 52 by the valve-closing spring 54, to close a pressure releasing port 51. Subsequently, the operating rod 46 is separated from the pressure releasing valve element 53. Thereafter, as shown in FIG. 2, the outer peripheral surface of the pilot valve element 18 is separated from the annular sealing member 48 downward.

As a result, compressed air in the pressure supply chamber 28 is introduced into the switching actuation chamber 36 through a valve opening clearance between the pilot valve element 18 and the annular sealing member 48, through the pilot valve chamber 45, and through a through hole 44*a* of the sleeve 44.

The sleeve 44 is raised by the compressed air in the switching actuation chamber 36 against the downward biasing force of the valve-closing spring 54 and the compression spring 58, and then the engagement surface 44*b* of the sleeve 44 is engaged with the sealing member 47 on the upper end wall 57. As a result, the pressure in the switching actuation chamber 36 increases rapidly, and the compressed air in the switching actuation chamber 36 strongly pushes and moves the supply/discharge valve body 24 downward to its lower limit position shown in FIG. 2, against the upward biasing force of the auxiliary spring 38. The protrusion 27 of the supply/discharge valve body 24 pushes therefore the first valve member 25 downward against the first spring 39. This causes the first pressure-discharge-side valve surface 25*b* to separate from the first pressure-discharge-side valve seat 29*b* (to open the valve) and causes the first pressure-supply-side valve surface 25*a* to engage with the first pressure-supply-side valve seat 29*a* (to close the valve). As a result, the first motor chamber 9 is communicatively connected to the pressure discharge port 15 through the first supply/discharge hole 32, the first working chamber 29, and the pressure discharge chamber 34. Furthermore, due to the downward biasing force of the second spring 40 and the pressure of the compressed air in the pressure supply chamber 28, the second valve member 26 is pushed downward. This causes the second pressure-supply-side valve surface 26*a* of the second valve member 26 to separate from the second pressure-supply-side valve seat 31*a* (to open the valve), and causes the second pressure-discharge-side valve surface 26*b* to engage with the second pressure-discharge-side valve seat 31*b* (to close the valve). As a result, the second motor chamber 10 is communicatively connected to the pressure supply port 14 through the second supply/discharge hole 33, the second working chamber 31, and the pressure supply chamber 28. Consequently, an ascending return stroke of the piston 8 is started.

When the pilot valve element 18 is switched (raised) from the lower limit position shown in FIG. 2 to the upper limit position shown in FIG. 1 along with the is ascent of the piston 8, the outer peripheral surface of the pilot valve element 18 is at first brought into close contact with an inner peripheral surface of the annular sealing member 48. Subsequently, the operating rod 46 causes the pressure releasing valve element 53 to separate from the pressure releasing valve seat 52 against the valve-closing spring 54, to discharge the compressed air in the switching actuation chamber 36 to the outside of the valve case 12 from the pressure discharge port 15, via the through hole 44*a* of the sleeve 44, via the valve opening clearance between the valve seat 52 and the pressure releasing valve element 53, and via the pressure releasing port 51. As a result, the supply/discharge valve body 24 is pushed upward by the pressure of the compressed air in the pressure supply chamber 28 and by the biasing force of the auxiliary spring 38, and is switched to the upper limit position. The protrusion 27 of the supply/discharge valve body 24 pushes therefore the second valve member 26 upward against the second spring 40. This causes the second pressure-discharge-side valve surface 26*b* to separate from the second pressure-discharge-side valve seat 31*b* (to open the valve) and causes the second pressure-supply-side valve surface 26*a* to engage with the second pressure-supply-side valve seat 31*a* (to close the valve). As a result, the second motor chamber 10 is communicatively connected to the pressure discharge port 15 through the second supply/discharge hole 33, the second working chamber 31, and the pressure discharge chamber 34. Furthermore, due to the upward biasing force of the first spring 39 and the pressure of the compressed air in the pressure supply chamber 28, the first valve member 25 is pushed upward. This causes the first pressure-supply-side valve surface 25*a* of the first valve member 25 to separate from the first pressure-supply-side valve seat 29*a* (to open the valve) and causes the first pressure-discharge-side valve surface 25*b* to engage with the first pressure-discharge-side valve seat 29*b* (to close the valve). As a w result, the first motor chamber 9 is communicatively connected to the pressure supply port 14 through the first supply/discharge hole 32, the first working chamber 29, and the pressure supply chamber 28. Consequently, a descending forward stroke of the piston 8 is started again.

In this embodiment, the annular sealing member 48 is not limited to those having a circular cross-section such as an O ring, and may have a cross section of another shape, such as a V shape, a U shape, and the like. Such a sealing member may be made of a material with good sealing properties such as rubber or of a material with good abrasion resistance such as resin, or may be made of combination of a plurality of materials. The annular sealing member 48 may be attached to an inner peripheral surface of the sleeve 44, instead of being attached to the under surface of the sleeve 44.

Furthermore, the motor 2 may be driven by using other types of gas such as nitrogen or by using hydraulic oil, instead of being driven by using air, as described in the above-described embodiment.

The following describes the structure of the plunger hydraulic pump 3, with reference to FIG. 1 and FIG. 2.

The plunger 22 provided so as to protrude downward from the piston 8 is inserted in the pump chamber 21 so as to be movable in the up-down direction. The pump chamber 21 is provided in a housing 20 of the pump 3. The plunger 22 includes; a first small-diameter portion 22*a*; a large-diameter portion 60 having a diameter larger than that of the first small-diameter portion 22*a*; and a second small-diameter portion 22*b* having a diameter substantially equal to that of the first small-diameter portion 22*a*. These portions are provided in this order from top to bottom (from the first end side to the second end side). Because the plunger 22 is designed so that the diameters of the first small-diameter portion 22*a* and the second small-diameter portion 22*b* are substantially equal to each other, the amount of hydraulic oil discharged from the pump chamber 21 by the plunger 22 in a forward stroke is substantially the same as that in a return stroke. If a difference between the amounts of the discharged oil in the forward and return strokes is required, the plunger may be designed so that the diameters of the first small-diameter portion 22*a* and the second small-diameter portion 22*b* are different from each other. In this case, an arrangement without the second small-diameter portion 22*b* is also possible.

The large-diameter portion 60 is hermetically inserted in the pump chamber 21. A first pump chamber 61 is provided above the large-diameter portion 60, and a second pump chamber 62 is provided below the large-diameter portion 60. An inlet port 63 and the outlet port 64 are provided to the housing 20 of the hydraulic pump 3. The inlet port 63 is connected to a hydraulic oil tank (not shown), and the outlet port 64 is connected to the outside. The inlet port 63 is communicatively connected to the first pump chamber 61 via a first inlet passage 63*a*, and to the second pump chamber 62 via a second inlet passage 63*b*. The outlet port 64 is communicatively connected to the first pump chamber 61 via a first outlet passage 64*a*, and to the second pump chamber 62 via a second outlet passage 64*b*. A first inlet valve 65 is provided to an intermediate portion of the first inlet passage 63*a*. A second inlet valve 66 is provided to an intermediate portion of the second inlet passage 63*b*. Each of the first inlet valve 65 and the second inlet valve 66 is a check valve including; a valve seat provided in the plunger hydraulic pump 3; and a valve element biased by a spring toward the valve seat. The first inlet valve 65 is configured to allow the flow of oil from the inlet port 63 to the first pump chamber 61 and to block the reverse flow. The second inlet valve 66 is configured to allow the flow of oil from the inlet port 63 to the second pump chamber 62 and to block the reverse flow. Furthermore, a first outlet valve 67 is provided to an intermediate portion of the first outlet passage 64*a*, and a second outlet valve 68 is provided to an intermediate portion of the second outlet passage 64*b*. Each of the first outlet valve 67 and the second outlet valve 68 is a check valve having a structure similar to that of the first inlet valve 65 and the like. The first outlet valve 67 is configured to allow the flow of oil from the first pump chamber 61 to the outlet port 64 and to block the reverse flow. The second outlet valve 68 is configured to allow the flow of oil from the second pump chamber 62 to the outlet port 64 and to block the reverse flow.

When the piston 8 is driven to descend, the large-diameter portion 60 of the plunger 22 descends. This increases the pressure of hydraulic oil in the second pump chamber 62. The high-pressure hydraulic oil in the second pump chamber 62 pushes a second outlet valve element 76 into an open position, with is the result that the high-pressure hydraulic oil is discharged through the outlet port 64. Meanwhile, the internal pressure in the first pump chamber 61 becomes lower than the pressure of hydraulic oil at the inlet port 63. Therefore the hydraulic oil at the inlet port 63 pushes a first inlet valve element 70 into an open position, with the result that the hydraulic oil at the inlet port 63 is taken into the first pump chamber 61.

When the piston 8 is driven to ascend, the large-diameter portion 60 of the plunger 22 ascends. This increases the pressure of hydraulic oil in the first pump chamber 61. The high-pressure hydraulic oil in the first pump chamber 61 pushes a first outlet valve element 74 into an open position, with the result that the high-pressure hydraulic oil is discharged through the outlet port 64. Meanwhile, the internal pressure in the second pump chamber 62 becomes lower than the pressure of hydraulic oil at the inlet port 63. Therefore the hydraulic oil at the inlet port 63 pushes a second inlet valve element 72 into an open position, with the result that the hydraulic oil at the inlet port 63 is taken into the second pump chamber 62. By repeating the above-described processes, high-pressure hydraulic oil is sent out to the outside from the outlet port 64 in both forward and return strokes. Thus, the plunger 22 is moved by the motor 2 with the substantially same driving force in the forward and return strokes, and discharges pressurized oil continuously in both of the forward and return strokes. As compared to known devices in which pressurized oil is discharged only in forward strokes, it is possible to increase the amount of discharged pressurized oil. Furthermore, pulsation of pressurized oil can be reduced because the hydraulic pump device of this embodiment is configured to continuously discharge pressurized oil.

Figure 3:
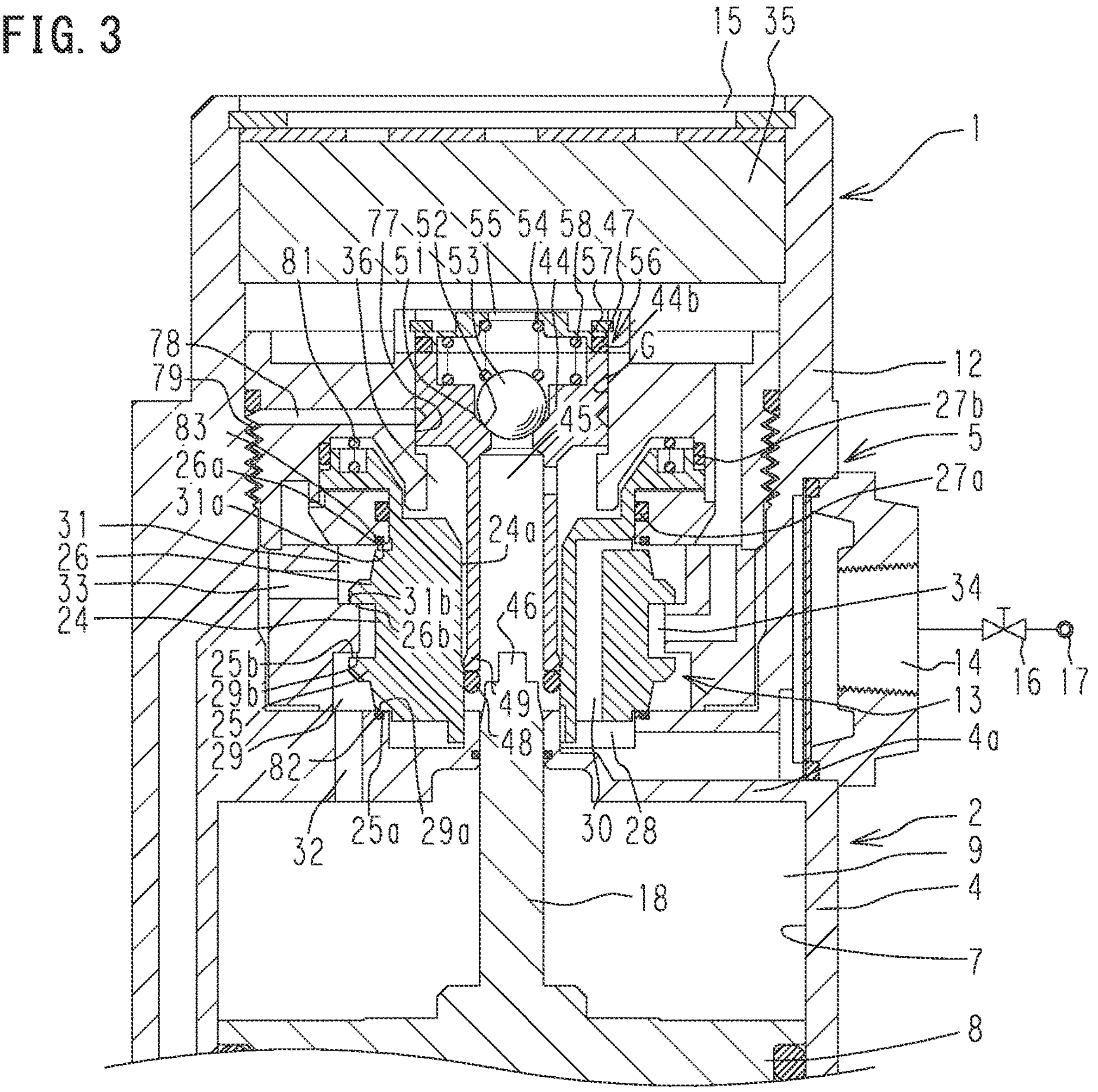
FIG. 3 is a diagram illustrating a part of a hydraulic pump device of a second embodiment of the present invention and similar to FIG. 2.

FIG. 3 shows a second embodiment of the present invention. In description of the second embodiment, components the same as or similar to the components in the first embodiment are given the same reference numerals, in principle.

The second embodiment is different from the first embodiment in the following points.

In the hydraulic pump device 1 of the second embodiment shown in FIG. 3, an auxiliary spring 81 is attached above the upper end portion of the supply/discharge valve body 24, in the switching actuation chamber 36. The auxiliary spring 81 biases the supply/discharge valve body 24 downward (toward the second end side in the axial direction) relative to the valve case 12. Due to this, the auxiliary spring 81 reliably biases the supply/discharge valve 13 downward before compressed air is supplied to the pressure supply port 14 of the hydraulic pump device. As a result, it is possible to prevent the situation in which the supply/discharge valve 13 is moved to an intermediate position to render the hydraulic pump device 1 inoperable.

In the first embodiment shown in FIG. 1, the supply/discharge valve 13 of the hydraulic pump device 1 is structured by combining separate elements such as the supply/discharge valve body 24, the first valve member 25, and the second valve member 26. Instead, the supply/discharge valve 13 of the hydraulic pump device 1 of the second embodiment is structured by the supply/discharge valve body 24, the first valve member 25, and the second valve member 26, which are unitary with one another. Because of this, the supply/discharge valve 13 of this embodiment has a simpler structure than that of the supply/discharge valve 13 of the first embodiment.

An accommodation groove is provided in the circumferential direction on a bottom wall of the first working chamber 29 of the hydraulic pump device 1, and a ring-like first valve seat member 82 is attached in the groove. The first w pressure-supply-side valve seat 29*a* is provided on a top surface of the first valve seat member 82. When the supply/discharge valve 13 is moved to its lower limit position, the second pressure-discharge-side valve surface 26*b* of the second valve member 26 is brought into contact with the second pressure-discharge-side valve seat 31*b*, and the first pressure-supply-side valve is surface 25*a* of the first valve member 25 is brought into contact with the first pressure-supply-side valve seat 29*a* of the first valve seat member 82. At this time, the first valve seat member 82 is elastically deformed by the supply/discharge valve 13. Due to this, the above-described valve surfaces are reliably brought into contact with the respective valve seats (to close the valves), simultaneously with or not simultaneously but in synchronization with each other while absorbing machining errors, assembling errors and the like of the supply/discharge valve 13 and the valve case 12. The first valve seat member 82 and a second valve seat member 83, which will be described later, each may be made of resin, rubber or another material, or of combination of two or more of these material. Alternatively, each valve seat member may be structured by a combination of a spring such as a coned disc spring and a coil spring and a ring-like member. The first valve seat member 82 may be attached in an accommodation groove provided on a ceiling wall of the first working chamber 29, instead of being attached in the accommodation groove provided on the bottom wall of the first working chamber 29. In this case, the first pressure-discharge-side valve seat 29*b* is provided on an under surface of the first valve seat member 82.

An accommodation groove is provided in the circumferential direction on a ceiling wall of the second working chamber 31, and the ring-like second valve seat member 83 similar to the first valve seat member 82 is attached in the accommodation groove. The second pressure-supply-side valve seat 31*a* is provided on an under surface of the valve seat member 83. When the supply/discharge valve 13 is moved to its upper limit position, the first pressure-discharge-side valve surface 25*b* of the first valve member 25 is brought into contact with the first pressure-discharge-side valve seat 29*b*, and w the second pressure-supply-side valve surface 26*a* of the second valve member 26 is brought into contact with the second pressure-supply-side valve seat 31*a* of the second valve seat member 83. At this time, the second valve seat member 83 is elastically deformed by the supply/discharge valve 13. Due to this, the above-described valve surfaces are reliably brought into contact with the is respective valve seats while absorbing machining errors, assembling errors and the like of the supply/discharge valve 13 and the valve case 12. The second valve seat member 83 may be attached in an accommodation groove provided on a bottom wall of the second working chamber 31, instead of being attached in the accommodation groove provided on the ceiling wall of the second working chamber 31. In this case, the second pressure-discharge-side valve seat 31*b* is provided on a top surface of the second valve seat member 83.

Furthermore, a passage 78 is provided in the valve case 12. The passage 78 communicatively connects an accommodation hole 77, in which the large-diameter portion of the sleeve 44 is inserted, to the pressure supply port 14. A throttle portion 79 is provided to an intermediate portion of the passage 78. Because of this, compressed air supplied to the pressure supply port 14 is supplied to the switching actuation chamber 36 through the throttle portion 79 of the passage 78 and through the throttle portion G.

Now, refer to the hydraulic pump device shown in FIG. 1 and FIG. 2, having no passage 78. Compressed air in the pilot valve chamber 45 may accidentally leak for some reason in a dosed state in which the pressure releasing valve element 53 is in contact with the pressure releasing valve seat 52. If this happens in the device, the supply/discharge valve 13 ascends from the lower limit position shown in FIG. 3 to a neutral position. Therefore, the pressure supply port 14 is communicatively connected to the pressure discharge port 15 through the first working chamber 29 and the second working chamber 31, while the first motor chamber 9 and the second motor chamber 10 are communicatively connected to the pressure discharge port 15. This could render the hydraulic pump device inoperable in a worst-case scenario.

To the contrary, in the hydraulic pump device of this embodiment, compressed air gently supplied to the switching actuation chamber 36 via the second motor chamber 10 and through the passage 78 compensates the compressed air leaking from the pilot valve chamber 45, and it is therefore is possible to prevent the device from becoming inoperable.

The throttle portion 79 may be provided all over the passage 78 to function as a throttle passage 79, instead of being provided at a part of the passage 78 as described in this embodiment.

Figure 4:
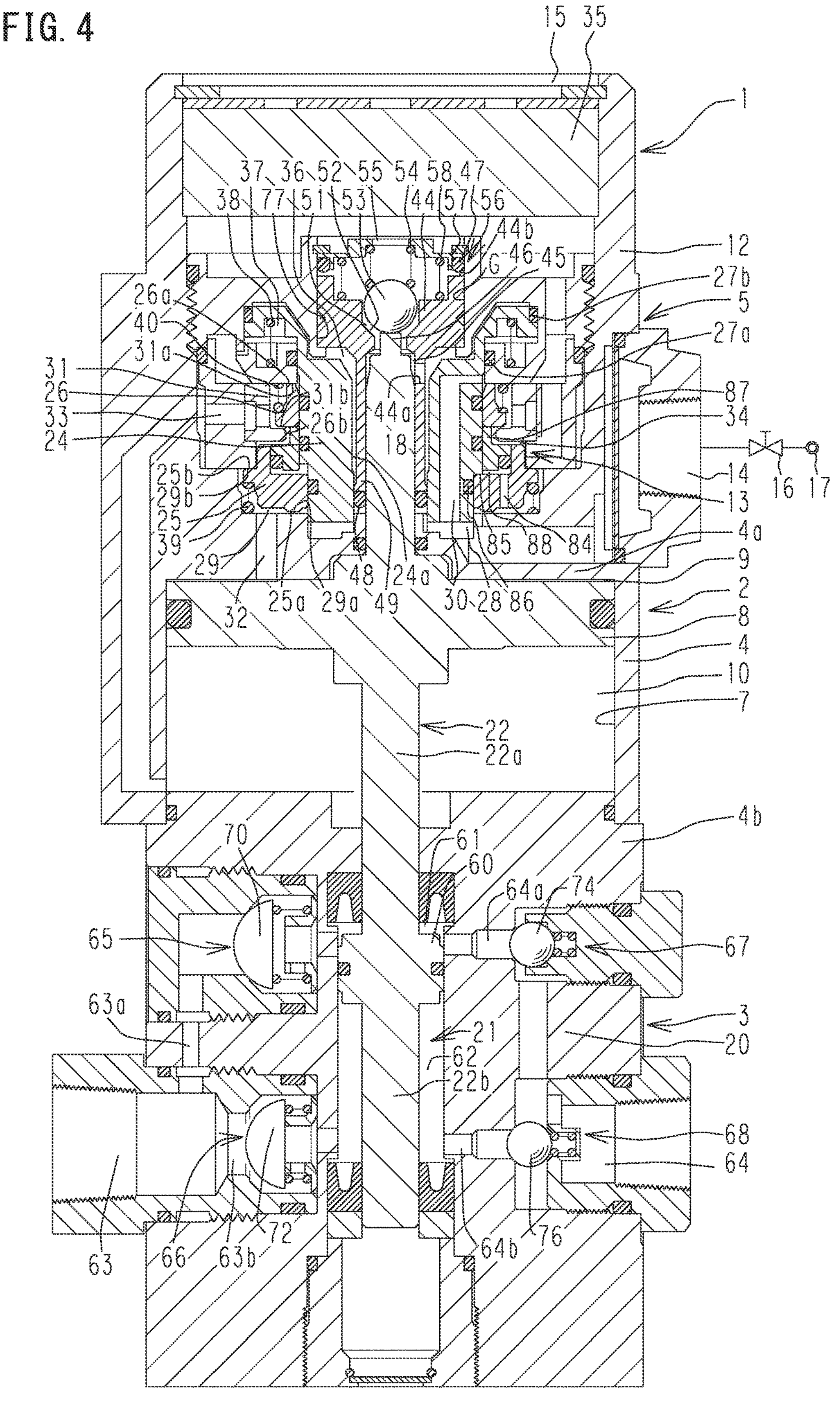
FIG. 4 is a diagram illustrating a part of a hydraulic pump device of a third embodiment of the present invention and similar to FIG. 1.
Figure 5:
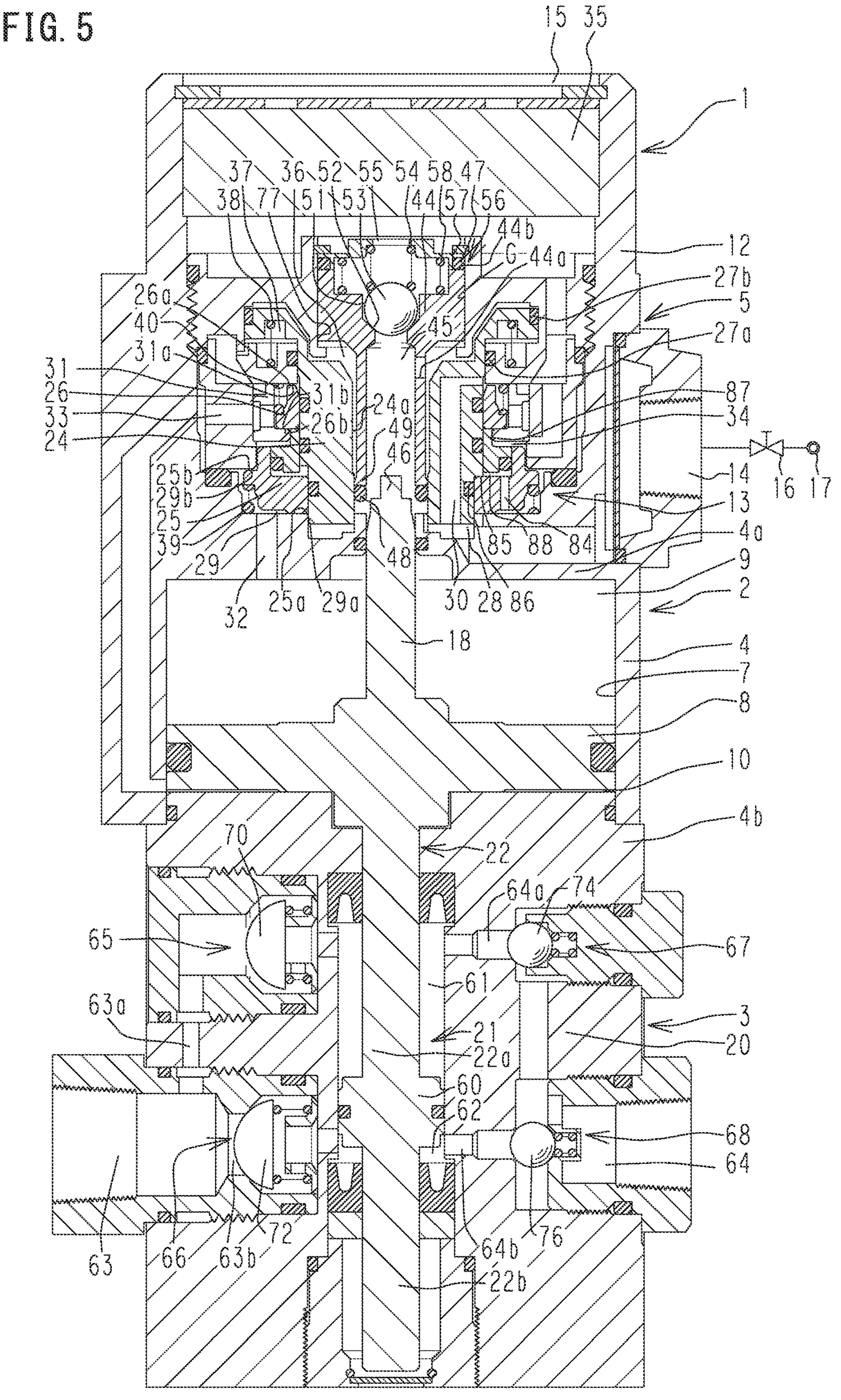
FIG. 5 is a diagram illustrating a part of the hydraulic pump device of the third embodiment of the present invention and similar to FIG. 2.

FIG. 4 and FIG. 5 show a third embodiment of the present invention. In description of the third embodiment, components the same as or similar to the components in the first and second embodiments are given the same reference numerals, in principle. The third embodiment is different from the first and second embodiments in the following points.

The supply/discharge mechanism 5 of this embodiment is structured as shown in FIG. 4 and FIG. 5.

The tubular supply/discharge valve 13 is inserted in the valve case 12 of the supply/discharge mechanism 5 so as to be movable in the up-down direction (the axial direction). The supply/discharge valve 13 has: the tubular supply/discharge valve body 24; the tubular first valve member 25 hermetically fitted over the outer peripheral wall of the lower portion of the supply/discharge valve body 24 so as to be movable in the up-down direction (the axial direction); the tubular second valve member 26 hermetically fitted over the outer peripheral wall of the upper portion of the supply/discharge valve body 24 so as to be movable in the up-down direction (the axial direction); and a tubular transmission member 87 inserted between the first valve member 25 and the second valve member 26. The first valve member 25 has the small-diameter portion and the large-diameter portion, which are arranged in this order from its lower side (from w the second end side in the axial direction). The second valve member 26 has the large-diameter portion and the small-diameter portion, which are arranged in this order from its lower side (from the second end side in the axial direction). The supply/discharge valve 13 is a single assembly made by combining the supply/discharge valve body 24 with the first valve member 25, the second valve is member 26, and the transmission member 87. The motor of this embodiment is thus configured so that, when the whole assembly is moved to its upper limit position or lower limit position, the supply/discharge valve 13 switches between supplying and discharging compressed air to and from the first motor chamber 9 simultaneously with or not simultaneously but in synchronization with switching between supplying and discharging compressed air to and from the second motor chamber 10.

The pressure supply chamber 28 is communicatively connected to the first working chamber 29, provided on the outer peripheral side of the lower portion of the supply/discharge valve 13, and is communicatively connected to the second working chamber 31, provided on the outer peripheral side of the upper portion of the supply/discharge valve 13, through the communication passage 30 provided in the supply/discharge valve body 24 in the up-down direction (the axial direction). The first working chamber 29 is communicatively connected to the first motor chamber 9 via the first supply/discharge hole 32 provided to the valve case 12. The second working chamber 31 is communicatively connected to the second motor chamber 10 via the second supply/discharge hole 33 provided to the valve case 12. The first valve member 25 is disposed in the first working chamber 29, and the second valve member 26 is disposed in the second working chamber 31. Furthermore, the transmission member 87 is disposed in the pressure discharge chamber 34. A lower portion of the transmission member 87 is hermetically inserted in a tubular hole of the first valve member 25 so as to be movable in the up-down direction, and an upper end surface of the transmission member 87 is contactable with the second valve member 26. An actuation chamber 88 is provided between an under surface of the transmission member 87 and the top surface of the first valve member 25. A passage 84 through which compressed air is supplied to/discharged from the actuation chamber 88 is provided in the first valve member 25. The passage 84 communicatively connects the actuation chamber 88 to the first working chamber 29.

The supply/discharge valve body 24 has a small-diameter portion and a large-diameter portion, which are arranged from its lower side in this order. The pressure discharge chamber 34 is provided on an outer peripheral side of the large-diameter portion of the supply/discharge valve body 24 and between the first working chamber 29 and the second working chamber 31.

The pilot valve element 18 (operating rod 46) and the opening/closing means 56 operate as follows.

When the pilot valve element 18 is switched (lowered) from its upper limit position shown in FIG. 4 to its lower limit position shown in FIG. 5 along with the descent of the piston 8, the pressure releasing valve element 53 is at first seated on the pressure releasing valve seat 52 by the valve-closing spring 54, to close its pressure releasing port 51. Subsequently, the operating rod 46 is separated from the pressure releasing valve element 53. Thereafter, as shown in FIG. 5, the outer peripheral surface of the pilot valve element 18 is separated from the annular sealing member 48 downward.

As a result, compressed air in the pressure supply chamber 28 is introduced into the switching actuation chamber 36 through the valve opening clearance between the pilot valve element 18 and the annular sealing member 48, through the pilot valve chamber 45, and through the through hole 44*a* of the sleeve 44.

The sleeve 44 is raised by the compressed air in the switching actuation chamber 36 against the downward biasing force of the valve-closing spring 54 and the compression spring 58, and then the engagement surface 44*b* of the w sleeve 44 is engaged with the sealing member 47 on the upper end wall 57. As a result, the pressure in the switching actuation chamber 36 increases rapidly, and the compressed air in the switching actuation chamber 36 strongly pushes the supply/discharge valve body 24 downward to its lower limit position shown in FIG. 5, against the upward biasing force of the auxiliary spring 38. Then, a step is portion 85 provided between the large-diameter portion and the small-diameter portion of the supply/discharge valve body 24 pushes the first valve member 25 downward against the first spring 39. This causes the first pressure-discharge-side valve surface 25*b* to separate from the first pressure-discharge-side valve seat 29*b* (to open the valve), and causes the first pressure-supply-side valve surface 25*a* to engage with the first pressure-supply-side valve seat 29*a* (to close the valve). As a result, the first motor chamber 9 is communicatively connected to the pressure discharge port 15 through the first supply/discharge hole 32, the first working chamber 29, and the pressure discharge chamber 34. Subsequently, due to the downward biasing force of the second spring 40 and the pressure of the compressed air in the pressure supply chamber 28, the second valve member 26 is pushed downward. This causes the second pressure-supply-side valve surface 26*a* of the second valve member 26 to separate from the second pressure-supply-side valve seat 31*a* (to open the valve), and causes the second pressure-discharge-side valve surface 26*b* to engage with the second pressure-discharge-side valve seat 31*b* (to close the valve). As a result, the second motor chamber 10 is communicatively connected to the pressure supply port 14 through the second supply/discharge hole 33, the second working chamber 31, and the pressure supply chamber 28. Consequently, an ascending return stroke of the piston 8 is started.

When the pilot valve element 18 is switched (raised) from the lower limit position shown in FIG. 5 to the upper limit position shown in FIG. 4 along with the ascent of the piston 8, the outer peripheral surface of the pilot valve element 18 is at first brought into close contact with the inner peripheral surface of the annular sealing member 48. Subsequently, the operating rod 46 causes the pressure releasing valve element 53 to separate from the pressure releasing valve seat 52 against the valve-closing spring 54, to discharge the compressed air in the switching actuation chamber 36 to the outside of the valve case 12 from the pressure discharge port 15, via the through hole 44*a* of the sleeve 44, via the valve opening clearance between the valve seat 52 and the pressure is releasing valve element 53, and via the pressure releasing port 51. As a result, the supply/discharge valve body 24 is pushed upward by the pressure of the compressed air in the pressure supply chamber 28 and by the biasing force of the auxiliary spring 38, and is switched to the upper limit position. Then, the first valve member 25 is pushed upward by: friction between a sealing member 86 attached to the outer peripheral wall of the supply/discharge valve body 24 and the first valve member 25; an upward biasing force of the first spring 39; and a pushing force by the pressure in the pressure supply chamber 28. This causes the first pressure-supply-side valve surface 25*a* of the first valve member 25 to separate from the first pressure-supply-side valve seat 29*a* (to open the valve), and causes the first pressure-discharge-side valve surface 25*b* to engage with the first pressure-discharge-side valve seat 29*b* (to close the valve). As a result, the first motor chamber 9 is communicatively connected to the pressure supply port 14 through the first supply/discharge hole 32, the first working chamber 29, and the pressure supply chamber 28. Furthermore, compressed air in the first working chamber 29 is supplied to the actuation chamber 88. The pushing force of the compressed air in the actuation chamber 88 pushes the second valve member 26 upward via the transmission member 87 against the second spring 40. This causes the second pressure-discharge-side valve surface 26*b* to separate from the second pressure-discharge-side valve seat 31*b* (to open the valve) and causes the second pressure-supply-side valve surface 26*a* to engage with the second pressure-supply-side valve seat 31*a* (to dose the valve). As a result, the second motor chamber 10 is communicatively connected to the pressure discharge port 15 through the second supply/discharge hole 33, the second working chamber 31, and the pressure discharge chamber 34. Consequently, a descending forward stroke of the piston 8 is started again.

The above-described embodiments are changeable as follows.

Instead of compressed air described by way of example, pressure fluid may be other types of gas or liquid such as pressurized oil.

The supply/discharge valve 13 may have the large-diameter portion and the small-diameter portion, which are arranged from bottom to top in this order, instead of having the small-diameter portion and the large-diameter portion, which are arranged from bottom to top in this order.

The pressure supply chamber 28 may be provided above (on the first end side in the axial direction relative to) the supply/discharge valve 13, instead of being provided below (on the second end side in the axial direction relative to) the supply/discharge valve 13. Furthermore, the switching actuation chamber 36 may be provided below (on the second end side in the axial direction relative to) the supply/discharge valve 13, instead of being provided above (on the first end side in the axial direction relative to) the supply/discharge valve 13.

The pressure supply port 14 does not have to be provided at a right portion of the hydraulic pump device and may be provided at another portion, for example, at its upper portion.

The auxiliary springs 38 and 81 do not have to be provided. The first spring 39 and the second spring 40 do not have to be provided.

Moreover, it is a matter of course that other changes or alterations can be made on the present invention within the scope of envisagement of one skilled in the art.

REFERENCE SIGNS LIST

3: pump; 4: motor main body; 5: supply/discharge mechanism; 7: cylinder w hole; 8: piston; 9: first motor chamber; 10: second motor chamber; 12: valve case; 13: supply/discharge valve; 22: plunger; 24: supply/discharge valve body; 24*a*: tubular hole; 25: first valve member; 26: second valve member; 27: protrusion; 28: pressure supply chamber; 29: first working chamber; 31: second working chamber; 34: pressure discharge chamber; 36: switching actuation is chamber; 38: auxiliary spring; 39: first spring; 40: second spring; 46: operating rod; 60: large-diameter portion; 61: first pump chamber; 62: second pump chamber; 63: inlet port; 63*a*: first inlet passage; 63*b*: second inlet passage; 64: outlet port; 64*a*: first outlet passage; 64*b*: second outlet passage; 65: first inlet valve; 66: second inlet valve; 67: first outlet valve; 68: second outlet valve; 73: first outlet passage; 78: passage; 79: throttle passage; 81: auxiliary spring; 85: step portion; 87: transmission member.

The invention claimed is:

1. A motor comprising:

a piston (8) inserted in a cylinder hole (7) provided in a motor main body (4) so as to be movable in an axial direction of the cylinder hole (7);

a first motor chamber (9) provided on a first end side in the axial direction relative to the piston (8);

a second motor chamber (10) provided on a second end side in the axial direction relative to the piston (8);

a supply/discharge valve (13) configured to switch between a state in which pressure fluid is discharged from the second motor chamber (10) and is supplied to the first motor chamber (9) and a state in which pressure fluid is discharged from the first motor chamber (9) and is supplied to the second motor chamber (10);

a pressure supply chamber (28) provided on the second end side in the axial direction relative to the supply/discharge valve (13), the pressure supply chamber (28) being configured so that pressure fluid supplied to the pressure supply chamber (28) pushes and moves the supply/discharge valve (13) to a first position on the first end side in the axial direction;

a switching actuation chamber (36) provided on the first end side in the axial direction relative to the supply/discharge valve (13), the switching actuation chamber (36) being configured so that pressure fluid supplied to the switching actuation chamber (36) pushes and moves the supply/discharge valve (13) to a second position on the second end side in the axial direction; and a pilot valve element (18) provided so as to protrude from the piston (8), the pilot valve element (18) being configured to switch between supplying and discharging pressure fluid to and from the switching actuation chamber (36) through movement of the pilot valve element (18) in the axial direction, wherein when the supply/discharge valve (13) is moved to the first position or to the second position, a first valve member (25) included in the supply/discharge valve (13) switches between supplying and discharging pressure fluid to and from the first motor chamber (9) and a second valve member (26) included in the supply/discharge valve (13) switches between supplying and discharging pressure fluid to and from the second motor chamber (10), and wherein, the supply/discharge valve (13) comprises:

a supply/discharge valve body (24);

the first valve member (25) of a tubular shape, fitted over an outer peripheral wall of the supply/discharge valve body (24) so as to be movable in the axial direction, the first valve member (25) being configured to be biased by a first spring (39) toward the first end side in the axial direction and received from the first end side in the axial direction by a protrusion (27) protruding from the outer peripheral wall of the supply/discharge valve body (24) outward in a radial direction of the supply/discharge valve body (24); and the second valve member (26) of a tubular shape, fitted over the outer peripheral wall of the supply/discharge valve body (24) so as to be movable in the axial direction, the second valve member (26) being configured to be biased by a second spring (40) toward the second end side in the axial direction and received by the protrusion (27) from the second end side in the axial direction.

2. The motor according to claim 1, wherein an auxiliary spring (38, 81) is attached on the first or second end side in the axial direction relative to the supply/discharge valve (13), and the auxiliary spring (38, 81) biases the supply/discharge valve (13) toward the second or first end side in the axial direction.

3. The motor according to claim 1, wherein the second motor chamber (10) is communicatively connected to the switching actuation chamber (36) by a passage (78), and a throttle passage (79) is provided at a part of or all over the passage (78).

4. The motor according to claim 1, further comprising:

a first working chamber (29) in which the first valve member (25) is disposed, the first working chamber (29) being communicatively connected to the pressure supply chamber (28);

a second working chamber (31) in which the second valve member (26) is disposed, the second working chamber (31) being communicatively connected to the pressure supply chamber (28); and a pressure discharge chamber (34) communicatively connected to the first working chamber (29) and to the second working chamber (31), the pressure discharge chamber (34) being provided between the first working chamber (29) and the second working chamber (31), wherein the first working chamber (29), the pressure discharge chamber (34), and the second working chamber (31) are arranged in the axial direction.

5. A hydraulic pump device comprising: the motor recited in claim 1; and a pump (3) configured to be driven by the motor, the device further comprising:

a plunger (22) connected to the piston (8) and inserted in the pump (3) so as to be movable in the axial direction, the plunger (22) including a large-diameter portion (60);

a first pump chamber (61) provided on the first end side in the axial direction relative to the large-diameter portion (60);

a second pump chamber (62) provided on the second end side in the axial direction relative to the large-diameter portion (60);

a first inlet valve (65) provided to a first inlet passage (63*a*) which communicatively connects an inlet port (63) of hydraulic oil to the first pump chamber (61), the first inlet valve (65) being configured to allow a flow of hydraulic oil from the inlet port (63) to the first pump chamber (61) and to block the reverse flow;

a second inlet valve (66) provided to a second inlet passage (63*b*) which communicatively connects the inlet port (63) to the second pump chamber (62), the second inlet valve (66) being configured to allow a flow of hydraulic oil from the inlet port (63) to the second pump chamber (62) and to block the reverse flow;

a first outlet valve (67) provided to a first outlet passage (64*a*) which communicatively connects the first pump chamber (61) to an outlet port (64) of pressurized oil, the first outlet valve (67) being configured to allow a flow of hydraulic oil from the first pump chamber (61) to the outlet port (64) and to block the reverse flow; and a second outlet valve (68) provided to a second outlet passage (64*b*) which communicatively connects the second pump chamber (62) to the outlet port (64) of hydraulic oil, the second outlet valve (68) being configured to allow a flow of hydraulic oil from the second pump chamber (62) to the outlet port (64) and to block the reverse flow.

6. The hydraulic pump device according to claim 5, wherein the plunger (22) comprises: a first small-diameter portion (22*a*) connected to the piston (8); the large-diameter portion (60) having a diameter larger than the diameter of the first small-diameter portion (22*a*) and connected to the first small-diameter portion (22*a*); and a second small-diameter portion (22*b*) having a diameter substantially equal to the diameter of the first small-diameter portion (22*a*) and connected to the large-diameter portion (60).

7. A motor comprising:

a piston (8) inserted in a cylinder hole (7) provided in a motor main body (4) so as to be movable in an axial direction of the cylinder hole (7);

a first motor chamber (9) provided on a first end side in the axial direction relative to the piston (8);

a second motor chamber (10) provided on a second end side in the axial direction relative to the piston (8);

a supply/discharge valve (13) configured to switch between a state in which pressure fluid is discharged from the second motor chamber (10) and is supplied to the first motor chamber (9) and a state in which pressure fluid is discharged from the first motor chamber (9) and is supplied to the second motor chamber (10);

a pressure supply chamber (28) provided on the second end side in the axial direction relative to the supply/discharge valve (13), the pressure supply chamber (28) being configured so that pressure fluid supplied to the pressure supply chamber (28) pushes and moves the supply/discharge valve (13) to a first position on the first end side in the axial direction;

a switching actuation chamber (36) provided on the first end side in the axial direction relative to the supply/discharge valve (13), the switching actuation chamber (36) being configured so that pressure fluid supplied to the switching actuation chamber (36) pushes and moves the supply/discharge valve (13) to a second position on the second end side in the axial direction; and a pilot valve element (18) provided so as to protrude from the piston (8), the pilot valve element (18) being configured to switch between supplying and discharging pressure fluid to and from the switching actuation chamber (36) through movement of the pilot valve element (18) in the axial direction, wherein when the supply/discharge valve (13) is moved to the first position or to the second position, a first valve member (25) included in the supply/discharge valve (13) switches between supplying and discharging pressure fluid to and from the first motor chamber (9) and a second valve member (26) included in the supply/discharge valve (13) switches between supplying and discharging pressure fluid to and from the second motor chamber (10), and wherein the supply/discharge valve (13) is structured by a supply/discharge valve body (24), the first valve member (25), and the second valve member (26), which are unitary with one another.

8. A motor comprising:

a piston (8) inserted in a cylinder hole (7) provided in a motor main body (4) so as to be movable in an axial direction of the cylinder hole (7);

a first motor chamber (9) provided on a first end side in the axial direction relative to the piston (8);

a second motor chamber (10) provided on a second end side in the axial direction relative to the piston (8);

a supply/discharge valve (13) configured to switch between a state in which pressure fluid is discharged from the second motor chamber (10) and is supplied to the first motor chamber (9) and a state in which pressure fluid is discharged from the first motor chamber (9) and is supplied to the second motor chamber (10);

a pressure supply chamber (28) provided on the second end side in the axial direction relative to the supply/discharge valve (13), the pressure supply chamber (28) being configured so that pressure fluid supplied to the pressure supply chamber (28) pushes and moves the supply/discharge valve (13) to a first position on the first end side in the axial direction;

a switching actuation chamber (36) provided on the first end side in the axial direction relative to the supply/discharge valve (13), the switching actuation chamber (36) being configured so that pressure fluid supplied to the switching actuation chamber (36) pushes and moves the supply/discharge valve (13) to a second position on the second end side in the axial direction; and a pilot valve element (18) provided so as to protrude from the piston (8), the pilot valve element (18) being configured to switch between supplying and discharging pressure fluid to and from the switching actuation chamber (36) through movement of the pilot valve element (18) in the axial direction, wherein when the supply/discharge valve (13) is moved to the first position or to the second position, a first valve member (25) included in the supply/discharge valve (13) switches between supplying and discharging pressure fluid to and from the first motor chamber (9) and a second valve member (26) included in the supply/discharge valve (13) switches between supplying and discharging pressure fluid to and from the second motor chamber (10), and wherein the supply/discharge valve (13) comprises:

a supply/discharge valve body (24);

the first valve member (25) of a tubular shape, fitted over an outer peripheral wall of the supply/discharge valve body (24) so as to be movable in the axial direction, the first valve member (25) being configured to be biased by a first spring (39) toward the first end side in the axial direction and received from the first end side in the axial direction by a step portion (85) provided to the supply/discharge valve body (24);

the second valve member (26) of a tubular shape, fitted over the outer peripheral wall of the supply/discharge valve body (24) so as to be movable in the axial direction, the second valve member (26) being configured to be biased by a second spring (40) toward the second end side in the axial direction; and a tubular transmission member (87) inserted between the first valve member (25) and the second valve member (26), the transmission member (87) being configured to receive the second valve member (26) from the second end side in the axial direction against a biasing force of the second spring (40).

* * * * *